March 21, 1961 I. V. ABADJIEFF 2,975,525
GAUGE DEVICE FOR DRILLS
Filed May 8, 1958
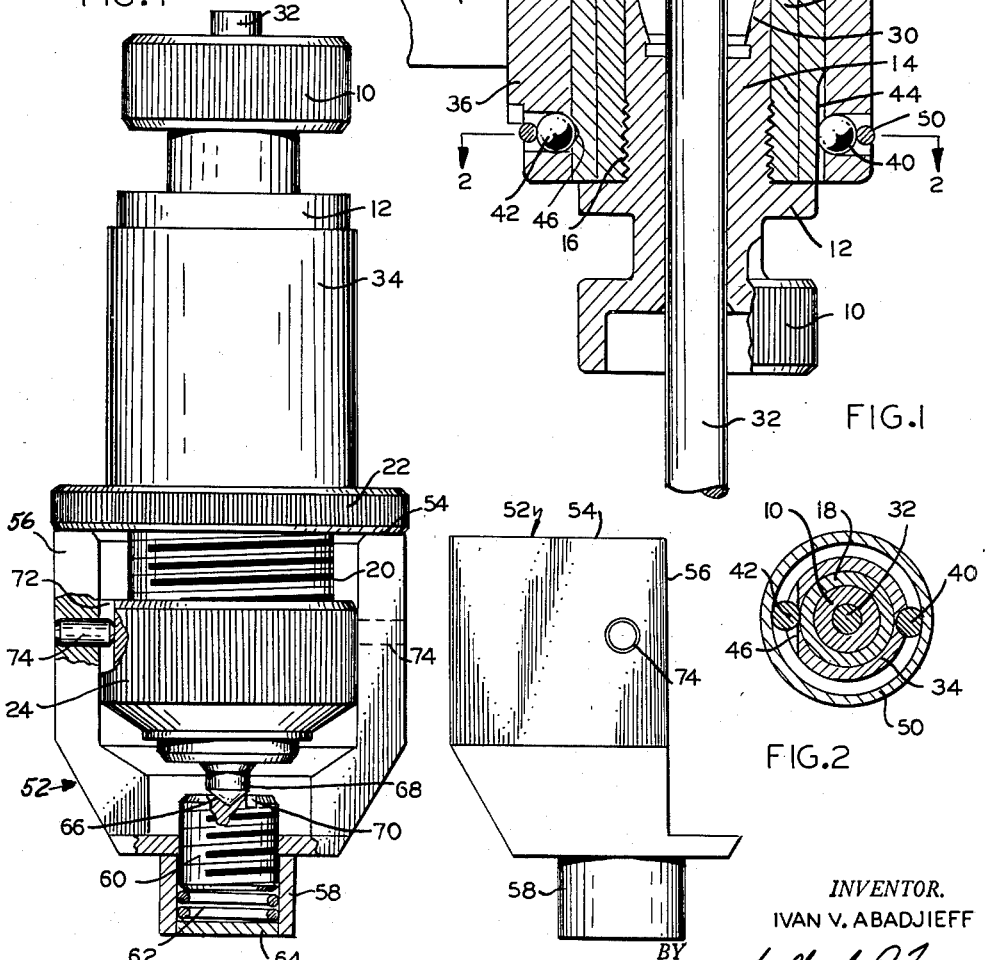
INVENTOR.
IVAN V. ABADJIEFF
BY
*Charles R. Fay*
ATTORNEY

United States Patent Office 2,975,525
Patented Mar. 21, 1961

2,975,525

GAUGE DEVICE FOR DRILLS

Ivan V. Abadjieff, Worcester, Mass.

Filed May 8, 1958, Ser. No. 733,925

7 Claims. (Cl. 33—185)

This invention relates to new and improved apparatus for quickly, easily and accurately sharpening drills and more particularly to a gauge for accurately positioning the drill to be sharpened in a chuck mounted on the apparatus.

The principal object of the present invention resides in the provision of a drill set attachment for the drill-holding chuck for quickly, accurately and easily determining the extent of the drill point from the drill-holding chuck in order that the same may be more accurately sharpened and thinned; also to correctly position the drill point to prevent a possible drill or grinding wheel breakage when a second drill is placed in the chuck and then introduced to the wheel for sharpening without backing the wheel from its position after sharpening the first drill; and the provision of a new and useful drill-holding chuck and a receiver therefor providing an accurate reversal of the drill for grinding both sides thereof and for holding the drill in proper thinning relation to a sharpening wheel, with an attachment or gauge for properly predetermining the correct position of the drill as to extent thereof from the chuck.

This case is a continuation-in-part of my copending application Serial No. 672,837 filed July 18, 1957.

Other objects and advantages of the invention will appear hereinafter.

Reference is to be had to the accompanying drawings, in which—

Fig. 1 is a sectional view through a drill chuck for holding the drill while it is being sharpened;

Fig. 2 is a section on line 2—2 of Fig. 1;

Fig. 3 is a view on an enlarged scale, parts being in section and illustrating the drill-holding chuck as applied to an attachment for accurately predetermining the extent of the drill from the holder;

Fig. 4 is a plan view of the gauge; and

Fig. 5 is a side view thereof.

The drill-holding chuck in this case comprises a cylindrical fingerhold or handle portion 10 by which the same may be manipulated. This fingerhold portion is provided with an inwardly spaced annular flange 12. The member 10 extends inwardly beyond the flange as at 14 and is externally secured at 16 to a surrounding sleeve 18. The sleeve 18 is externally threaded at its opposite end as at 20 to receive a nut 22 and a conical cap 24.

The chuck itself is provided with a series of radially expansible connected holding fingers 26 and the cap longitudinally moves a thimble 28 having an internal conical surface 29. The finger-holding portion 14 is provided with an oppositely-directed internal conical surface 30, and the fingers have complementary surfaces. Between these conical surfaces, the chuck fingers 26 are held in position and upon proper manipulation of handle 10, the chuck fingers may be radially compressed to hold the drill 32 in fixed relation in the chuck.

The sleeve 18 is slidable in a surrounding sleeve 34 but when lock nut 22 is rotated on sleeve 18, sleeve 34 is clamped between the flange 12 and nut 22. The reference numeral 36 represents a holder for the entire drill-holding chuck as will be clear from the parent application identified above and this comprises a sleeve mounted on an arm 38 attached to the base of the drill-grinding machine.

By grasping the chuck and turning it so that balls 40 and 42 are forced out of their respective grooves at 44 and 46, the entire chuck is rotatably movable so as to give a 180° turn determined by the fact that the ball 42 will snap into the groove 44 and the ball 40 will snap into recess 46. Groove 44 maintains the chuck against accidental rotation and the recess 46 maintains the chuck against vertical displacement. The balls are held in place by a conventional O-ring which is indicated at 50.

The gauge attachment for the drill-holding chuck comprises the fixture which is shown in Figs. 4 and 5 and which is illustrated in Fig. 3 with the drill-holding chuck applied thereto in drill-point gauging position.

The fixture comprises a generally semicylindrical or larger arcuate housing generally indicated at 52. This housing is provided with an upper flat gauge surface 54, being cut away at the forward portion thereof as at 56 and having a hollow internally-threaded cylindrical portion 58 at the lower end.

In this cylindrical portion 58, there is a screw 60 threadedly engaged therewith, and upon being turned is adjusted up-and-down as will be clear. This screw may have a shake-proof spring 62 held by a washer 64 and in its upper surface it is provided with an inverted central conical depression 66 which receives the point of the drill herein indicated in Fig. 3 as at 68. The screw 60 is provided with a non-diametrically located screwdriver slot 70 by means of which the screw 60 is adjustable up-and-down without interfering with the conical depression 66 so that the latter accurately determines the projection of the point 68 of the drill from the chuck itself. The chuck is held in a predetermined relation to the fixture, in which relation the drill 32 is coaxial with the fixture and with the screw 60.

The cap 24 which might be referred to as a "lock nut" is provided with longitudinally arranged diametrically opposed slots at the edges thereof as indicated at 72, and these slots receive fixed pins 74 which are located oppositely in the side walls of the arcuate member 52. When the drill-holding chuck is placed in the fixture, the pins 74 enter these slots and of course therefore locate the chuck and prevent the same and particularly the lock nut from rotating.

In the use of the device, the nut 22 acts as a flange and it contacts the surface 54 acting as a gauge surface. Surface 54 of course is relatively fixed insofar as the fixture itself is concerned and is therefore a fixed stop; whereas the adjustable screw 60 is an adjustable stop which is of course adjustable longitudinally of the drill-holding chuck relative to the fixed stop 54.

Therefore, inserting the drill-holding chuck into the fixture, and abutting what was the top surface of nut 22 in Fig. 1 but is now the bottom surface as in Fig. 3 against surface 54, it will be seen that if the drill point 68 fails to touch the screw 60, it does not extend out far enough. Therefore the handle portion 10 is loosened to allow the drill to descend relative to the chuck, and handle 10 is then again tightened as above described in order to once more clamp the drill in the required position. Then it will be in the accurately predetermined and desired extent relative to the chuck, for accurate sharpening on the apparatus disclosed in the parent case.

If the drill point extends too far out from the chuck, the nut 22 will fail to touch surface 54, and proper adjustment is then made, as described, to retract the drill to the desired extent.

The combination of the two stops 54 and 60 determines the setting desired, and the screw 60 may be adjusted to provide for varied conditions.

Also, this gauge so limits the extent of the drill point from the holder as to prevent breakage both of drill and wheel when another drill is operated upon, if the operator fails to back off the wheel between drills.

Having thus described my invention and the advantages thereof, I do not wish to be limited to the details herein disclosed, otherwise than as set forth in the claims, but what I claim is:

1. A gauge device comprising a fixture, an adjustable stop therein to engage the point of a drill loosely held in a drill holding chuck, a stop on the fixture to receive and locate the drill chuck in the fixture, the extent of the drill from the chuck being determined by the adjustment of the first-named stop relative to the second-named stop, the adjustable stop being coaxial with the drill chuck.

2. A gauge device comprising a fixture, an adjustable stop centrally located therein to engage the point of a drill loosely held in a drill holding chuck, a fixed stop on the fixture to receive and locate the drill chuck, the extent of the drill from the chuck being determined by the adjustment of the first-named stop relative to the second-named stop, said chuck being capable of gripping the drill in fixed adjusted position therein.

3. A gauging device for determining the extent of a drill point from a drill-holding chuck having a flange and a lock nut, said device comprising a fixture for receiving the chuck in a predetermined relation therein, a stop on the fixture to engage the flange on the chuck and so locate the chuck in the fixture, a second stop in the fixture spaced from the first-named stop, said second stop being coaxial with the center of the chuck and gauging the extent of the drill point with the chuck so located.

4. A gauging device for determining the extent of a drill point from a drill-holding chuck having a flange and a lock nut, said device comprising a fixture for receiving the chuck in predetermined relation therein, a stop on the fixture to engage the flange on the chuck and so locate the chuck in the fixture, a second stop in the fixture spaced from the first-named stop and gauging the extent of the drill point with the chuck so located, and means on the fixture to fix the lock nut on the chuck against turning.

5. A gauging device for determining the extent of a drill point from a drill-holding chuck having a flange and a lock nut, said device comprising a fixture for receiving the chuck in predetermined relation therein, a stop on the fixture to engage the flange on the chuck and so locate the chuck in the fixture, a second stop in the fixture coaxial with a drill in the chuck when the latter is in the fixture, said second stop being spaced from the first-named stop and gauging the extent of the drill point with the chuck so located, and means on the fixture to fix the lock nut on the chuck against turning, the chuck being capable of locking the drill when the latter is in the fixture.

6. The device of claim 5 wherein the second-named stop is adjustable.

7. The device of claim 5 wherein the second-named stop is threaded and adjustable by means of an offset, non-diametric screw-driver slot.

References Cited in the file of this patent

UNITED STATES PATENTS

| | | |
|---|---|---|
| 809,037 | Walker | Jan. 2, 1906 |
| 2,613,414 | Jones | Oct. 14, 1952 |
| 2,794,362 | Yale | June 4, 1957 |
| 2,886,895 | Kushion | May 19, 1959 |

FOREIGN PATENTS

| | | |
|---|---|---|
| 596,472 | Great Britain | Jan. 5, 1948 |